United States Patent
Kloeppel et al.

(10) Patent No.: US 6,804,987 B2
(45) Date of Patent: Oct. 19, 2004

(54) APPARATUS AND METHOD FOR AIR-CONTAMINATION DETECTION IN DISC DRIVE HYDRODYNAMIC BEARINGS

(75) Inventors: Klaus D. Kloeppel, Watsonville, CA (US); Gregor Paco Flores, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/141,089

(22) Filed: May 7, 2002

(65) Prior Publication Data

US 2003/0121308 A1 Jul. 3, 2003

Related U.S. Application Data

(60) Provisional application No. 60/345,060, filed on Jan. 3, 2002.

(51) Int. Cl.[7] .................................. G01N 3/56
(52) U.S. Cl. ............................... 73/10; 73/37
(58) Field of Search ................ 73/10, 7, 37, 865.9

(56) References Cited

U.S. PATENT DOCUMENTS

| | | | |
|---|---|---|---|
| 5,200,867 A | * 4/1993 | Albrecht et al. | 360/234.1 |
| 5,824,920 A | * 10/1998 | Sugimoto et al. | 73/865.8 |
| 6,173,234 B1 | * 1/2001 | Lee | 702/50 |
| 6,530,143 B1 | * 3/2003 | Jennings et al. | 29/721 |
| 2003/0117739 A1 | * 6/2003 | Aiello et al. | 360/75 |

* cited by examiner

Primary Examiner—Hezron Williams
Assistant Examiner—Nashmiya Fayyaz
(74) Attorney, Agent, or Firm—Raghunath S. Minisandram; Jesus Del Castillo

(57) ABSTRACT

A method for detecting air-contamination within a hydrodynamic bearing used with a disc drive comprises in one embodiment, a method to detect air-contamination with hydrodynamic fluid by measuring operating signals of the disc drive between different external air pressure conditions (including ambient) on the hydrodynamic bearing and comparing the operating signals to predetermined threshold values. In another aspect, the invention provides an air-contamination detecting apparatus adapted to detect air-contamination within the fluid of a hydrodynamic bearing. In another aspect, the invention provides a method to determine air-contamination within hydrodynamic bearings using the change in disc drive input/output signals responsive to air-pressure changes on the hydrodynamic bearings.

14 Claims, 6 Drawing Sheets

APPARATUS AND METHOD FOR AIR-CONTAMINATION DETECTION IN DISC DRIVE HYDRODYNAMIC BEARINGS

CROSS REFERENCE TO A RELATED APPLICATION

This invention is based on U.S. Provisional Patent Application Ser. No. 60/345,060 filed Jan. 3, 2002, entitled "Method To Detect Air In FDB Bearing Via Run Current" filed in the name of Klaus Dieter Kloeppel and Gregor (Paco) Flores. The priority of this provisional application is hereby claimed.

BACKGROUND OF THE INVENTION

1. Field of the Invention

The invention relates generally to the field of disc drives, and more particularly to an apparatus and method for detecting air-contamination of hydrodynamic bearings within a disc drive.

2. Description of the Related Art

Disc drives are capable of storing large amounts of digital data in a relatively small area. Disc drives store information on one or more recording media. The recording media conventionally takes the form of a circular storage disc, e.g., media, having a plurality of concentric circular recording tracks. A typical disc drive has one or more discs for storing information. This information is written to and read from the discs using read/write heads mounted on actuator arms that are moved from track to track across surfaces of the discs by an actuator mechanism.

Generally, the discs are mounted on a spindle that is turned by a spindle motor to pass the surfaces of the discs under the read/write heads. The spindle motor generally includes a shaft supported from a base plate and a hub, to which the spindle is attached, having a sleeve into which the shaft is inserted. Permanent magnets attached to the hub interact with a stator winding to rotate the hub relative to the shaft. In order to facilitate rotation, one or more bearings are usually disposed between the hub and the shaft.

Over time, disc drive storage density has tended to increase and the size of the storage system has tended to decrease. This trend has lead to greater precision and lower tolerance in the manufacturing and operating of magnetic storage discs. For example, to achieve increased storage densities the read/write heads must be placed increasingly close to the surface of the storage disc.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor because of low damping.

One alternative bearing design is a hydrodynamic bearing. In a hydrodynamic bearing, a lubricating fluid such as air or sleeve provides a bearing surface between a fixed member of the housing (e.g. shaft) and a rotating member of the disc hub. Typical lubricants include oil or other fluid (i.e., hydrodynamic fluid). Hydrodynamic bearings spread the bearing interface over a large surface area in comparison with a ball bearing assembly, which comprises a series of point interfaces. This is desirable because the increased bearing surface reduces wobble or run-out between the rotating and fixed members. Further, the use of fluid in the interface area imparts damping effects to the bearing which helps to reduce non-repeatable run-out.

Generally, during the manufacturing of the hydrodynamic bearings using oil or, the hydrodynamic bearing undergoes a lubricating fluid fill process. Sometimes during the lubricating fluid fill process, air is inadvertently introduced into the lubricating fluid in the form of air bubbles. Unfortunately, the air bubbles may cause fluid pressure inconsistencies within the hydrodynamic bearing. Further, during operation, the air bubbles may expand, reducing the average viscosity of the hydrodynamic bearing fluid increasing wobble or run-out between the rotating and fixed members.

Generally, for hydrodynamic bearings, such as stationary shaft and two piece hub-shaft motors, the meniscus of the fluid is checked under a vacuum for changes due to air-contamination. For example, a microscope may be used to visually check the fluid meniscus change in dimension when a vacuum is applied. If air is present in the hydrodynamic bearings, the meniscus width, height, etc., within the capillary seal or similar location at an end of the bearing may vary as a function of the amount of air present. However, the process is slow; and the construction of the bearing may make such visual inspection difficult or impossible.

Differential weight changes between reference weights may also be used to inspect for the air-contamination of fluid within a hydrodynamic bearing. Unfortunately, this methodology is time consuming and prone to inaccuracy, as the amount of air within the hydrodynamic fluid may be very small in comparison to the fluid volume. Accordingly, the measurements may lead to an increase in disc drive manufacturing time, premature disc drive failure due to inaccurate measurements, and ultimately an increase in the cost of the disc drive.

Therefore, a need exists for a method and apparatus to provide a reliable and repeatable hydrodynamic bearing air-contamination test.

SUMMARY OF THE INVENTION

Embodiments of the invention generally provide a method for detecting air-contamination of hydrodynamic bearings used with a disc drive. In one embodiment, the invention generally provides a method of measuring air-contamination within a hydrodynamic bearing of a disc drive at different levels of air pressure. The method comprises rotating a disc drive motor and providing at least one first measurement of one or more disc drive input/output signals responsive to air-contamination within the hydrodynamic bearing. The method then compares at least one second measurement of the one or more disc drive input/output signals to the at least one first measurement, the measurements being taken at two different pressures. If the at least one second measurement is different than the at least one first measurement, then determining if the difference between the first and second measurements is indicative of at least one unacceptable disc drive operational condition.

In another embodiment, the invention provides an apparatus for measuring air-contamination within a disc drive hydrodynamic bearing. The apparatus comprising a means for rotating a disc drive motor, and a means for detecting, during the rotation of the disc drive motor, at least one disc drive input/output signal responsive as a function of air-contamination within the hydrodynamic bearing between at least a first and second external pressure on the hydrodynamic bearing.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
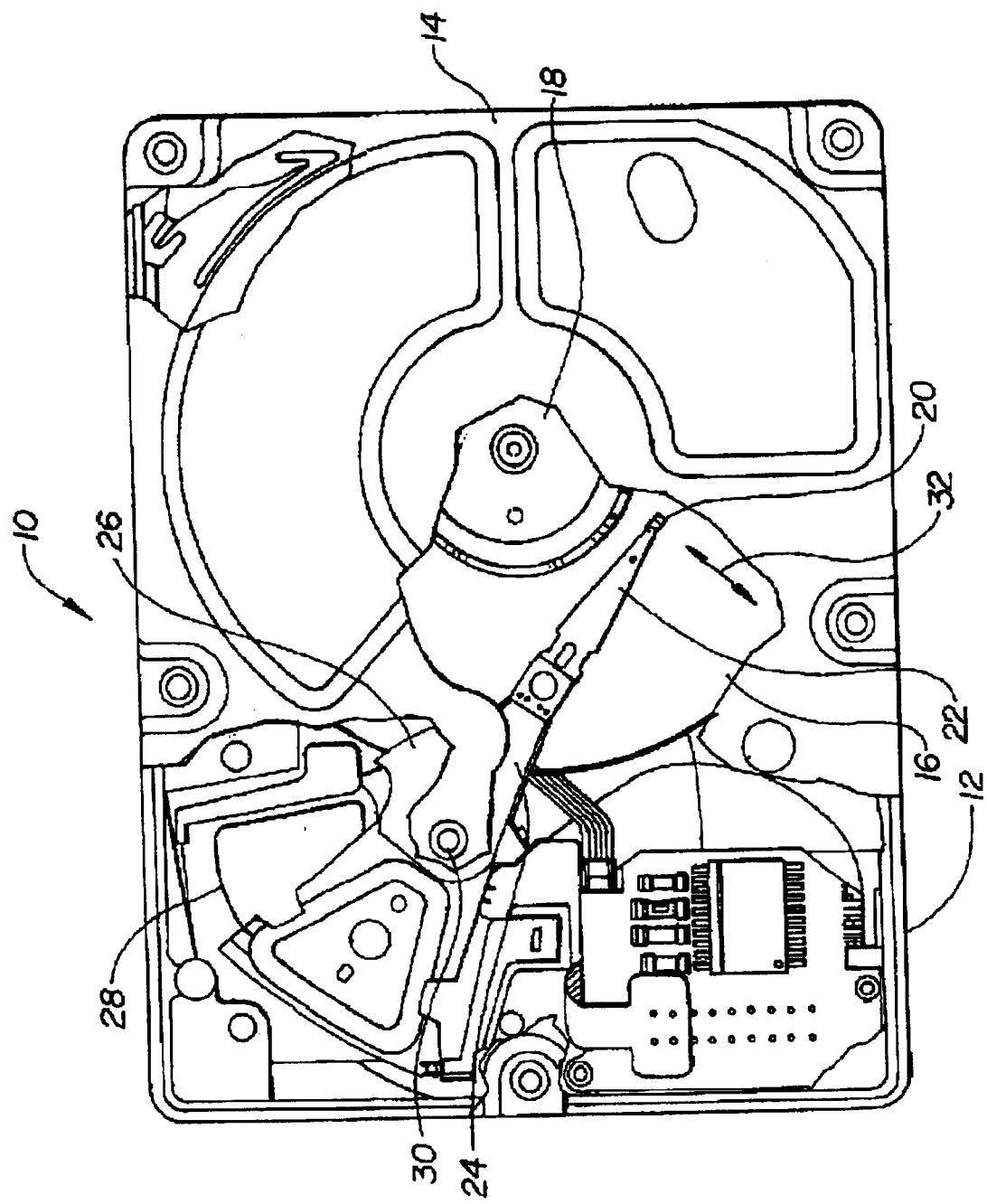
FIG. 1 depicts a plan view of one embodiment of a disc drive for use with aspects of the invention.

FIG. 1 depicts a plan view of one embodiment of a disc drive 10 which may well use motors which include embodiments of the invention. However, the invention is equally useful in all forms of motors with hydrodynamic bearings, and indeed in the testing of all such bearings.

Referring to FIG. 1, in this instance, the disc drive 10 includes a housing base 12 and a top cover 14. The housing base 12 is combined with top cover 14 to form a sealed environment to protect the internal components from contamination by elements from outside the sealed environment. The base and top cover arrangement shown in FIG. 1 is well known in the industry. However, other arrangements of the housing components have been frequently used, and aspects of the invention are not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14. Disc drive further includes a disc pack 16 which is mounted for rotation on a spindle motor (not shown) by a disc clamp 18. Disc pack 16 includes one or a plurality of individual discs that are mounted for co-rotation about a central axis. Each disc surface has an associated read/write head 20 which is mounted to disc drive 10 for communicating with the disc surface. In the example shown in FIG. 1, read/write heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached read/write heads 20 about a pivot shaft 30 to position read/write heads 20 over a desired data track along a path 32.

Figure 2:
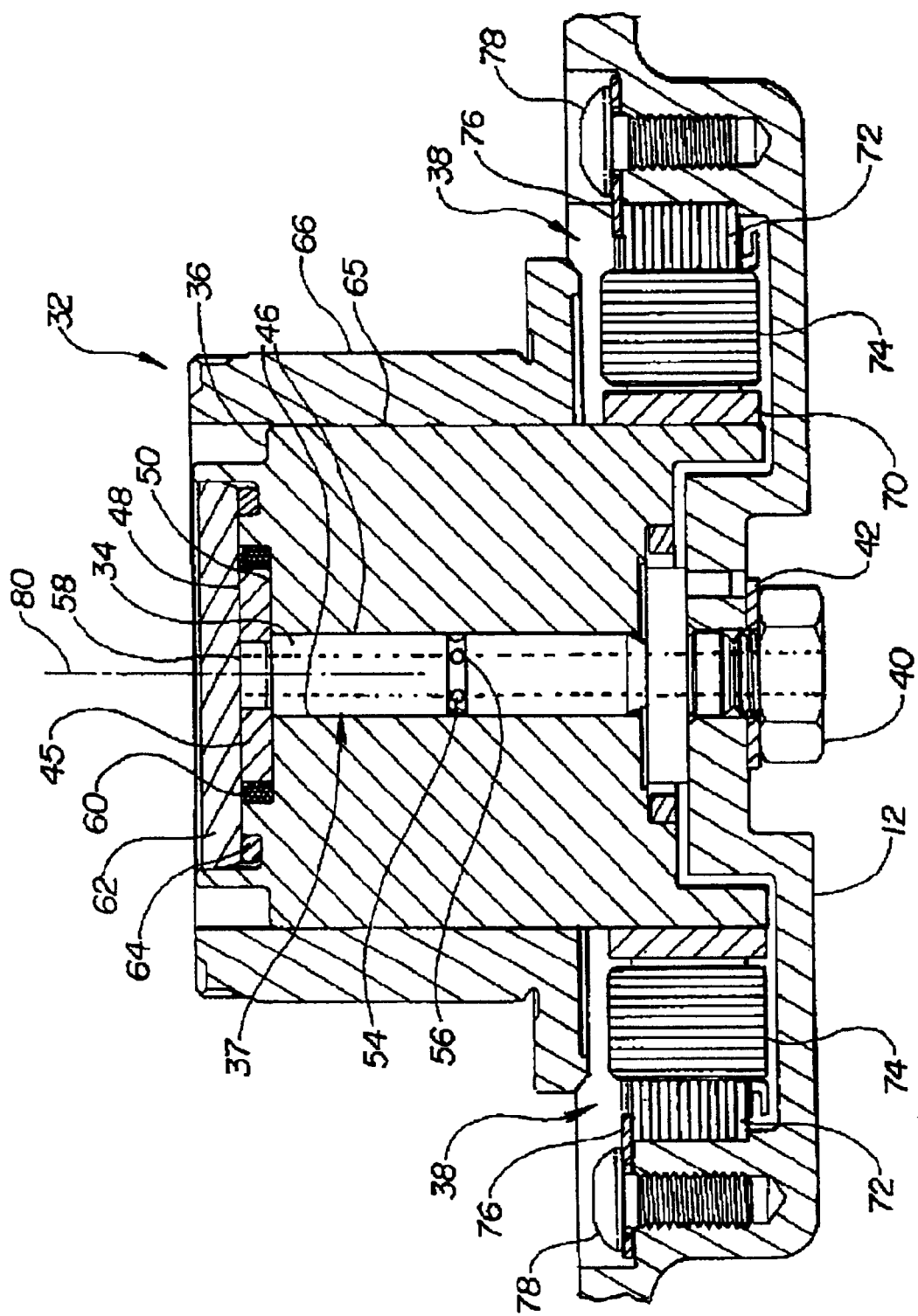
FIG. 2 is a sectional side view depicting one embodiment of a spindle motor for use with aspects of the invention.

FIG. 2 is a sectional view of a hydrodynamic bearing spindle motor 32 which the invention is useful. Spindle motor 32 includes a stationary member 34, a hub 36, and a stator 38. In the embodiment shown in FIG. 2, the stationary member is a shaft that is fixed and attached to base 12 through a nut 40 and a washer 42. Hub 36 is interconnected with shaft 34 through a hydrodynamic bearing 37 for rotation about shaft 34. Hydrodynamic bearing 37 includes a radial working surface 46 (e.g., journal surface) and axial working surfaces 48 and 50 (e.g., thrust surface). Shaft 34 includes fluid ports 54, 56, and 58 which supply hydrodynamic fluid 60 and assist in circulating the fluid along the working surfaces of the hydrodynamic bearing 37. The hydrodynamic bearing 37 may include a series of hydrodynamic grooves positioned thereon. The hydrodynamic grooves 35 may be disposed upon the shaft 34, and/or the hub 36 to facilitate the supply and distribution of the hydrodynamic fluid 60 to the radial and axial working surfaces 46–50, of the hydrodynamic bearing 37. The hydrodynamic grooves 35 may be configured any number of ways depending on the hydrodynamic bearing load requirements. For example, the hydrodynamic grooves 35 may include sinusoidal grooves, herringbone grooves, helix grooves, and other similar grooves. The spacing between the hydrodynamic grooves 35 is defined as the "land" which may vary between the hydrodynamic grooves 35 to accommodate various fluid flow requirements. Hydrodynamic fluid 60 is supplied to shaft 34 by a fluid source (not shown), which is coupled to the interior of shaft 34 in a known manner. Spindle motor 32 further includes a thrust bearing 45, which forms the axial working surfaces 48 and 50 of hydrodynamic bearing 37. A counterplate 62 bears against working surface 48 to provide axial stability for the hydrodynamic bearing 37 and to position the hub 36 within spindle motor 32. An O-ring 64 is provided between counterplate 62 and hub 36 to seal the hydrodynamic bearing 37. The seal prevents hydrodynamic fluid 60 from escaping between counterplate 62 and hub 36. Hub 36 includes a central core 65 and a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for a spindle motor 32. Rotor magnet 70 can be formed as a unitary, annular ring or can be formed of a plurality of individual magnets which are spaced about the periphery of hub 36. Rotor magnet 70 is magnetized to form one or more magnetic poles.

Stator 38 is attached to base 12 and includes a magnetic field focusing member or stator stack 72 and a stator winding 74. Stator winding 74 is attached to back-iron 72 between back-iron 72 and rotor magnet 70. Stator winding 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78. Commutation pulses applied to stator winding 74 generate a rotating magnetic field that communicates with rotor magnet 70 and causes hub 36 to rotate about central axis 80 on bearing 37. In the embodiment shown in FIG. 2, spindle motor 32 is a "below-hub" type motor in which stator 38 is positioned below hub 36. Stator 38 also has a radial position that is external to hub 36, such that stator winding 74 is secured to an inner diameter surface 82 of stator stack iron 72.

Figure 3A:
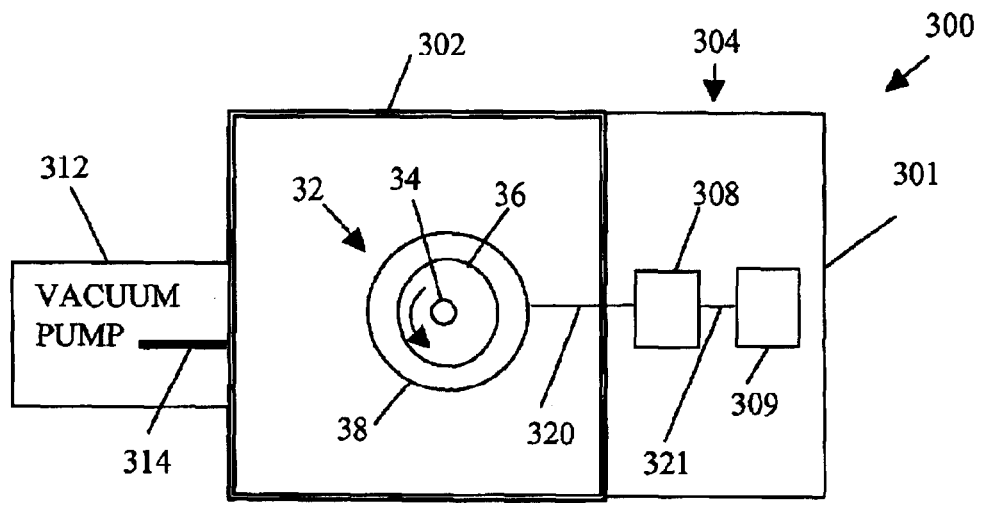
FIGS. 3A and 3B depict a plan view and top view of one embodiment of a testing apparatus for use with aspects of the invention.
Figure 3B:
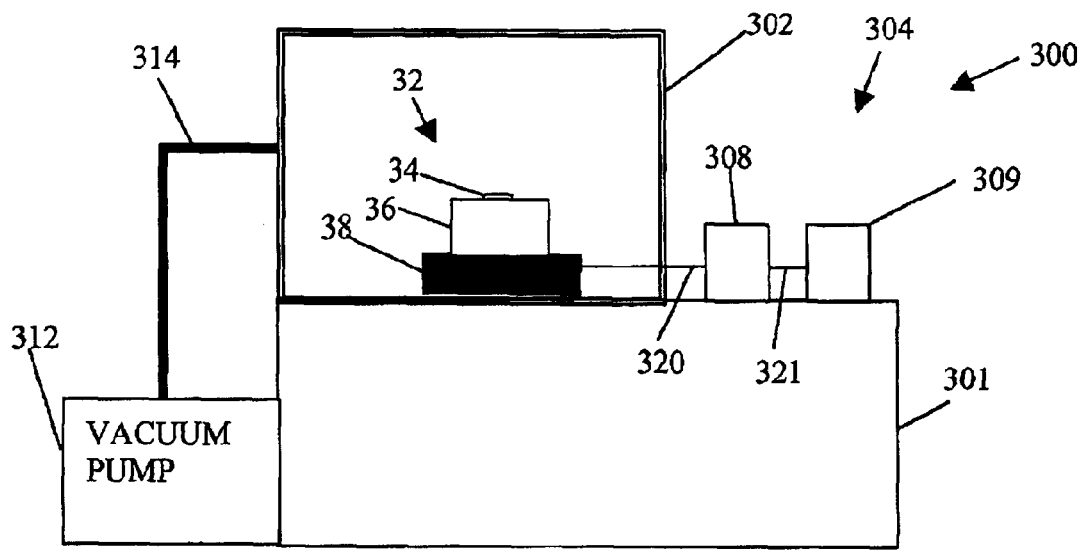

FIGS. 3A and 3B depict a simplified plan view and top view for one embodiment of an apparatus to detect air-contamination in a hydrodynamic bearing 37 of a disc drive 10. FIGS. 1–2 are referenced as needed in the discussion of FIGS. 3A and 3B.

FIGS. 3A and 3B illustrate a testing apparatus 300 adapted to detect air-contamination in hydrodynamic bearings 37. The testing apparatus 300 may include a back-end system 301 configured to supply power and control signals to activate and/or control at least some of the operations of the disc drive 10. For example, the back-end system 301 may be adapted to provide electrical power to the spindle motor 32. Further, while in one aspect the back-end system 301 may included a vacuum pump 312 having a vacuum line 314 coupled to a vacuum chamber 302 disposed thereon, to draw a vacuum therefrom, it also contemplated that the vacuum chamber 302 may be coupled to an external vacuum source (not shown) to provide a vacuum within the vacuum chamber 302. The vacuum chamber 302 is configured to hold one or more assemblies such as the disc drive 10, spindle motor 32, and the like, therein to draw a vacuum therefrom.

In one aspect, the testing apparatus 300 is coupled to air-contamination detection apparatus 304 that includes a meter 308 such as a current meter, oscilloscope, power meter, volt meter, network analyzer, spectrum analyzer and other meters that may be used to measure electrical input/output signals. In one configuration, the meter 308 is adapted to measure signal levels used to activate the disc drive 10 such as input power, disc drive control signals, and other signals used to power and/or otherwise control the disc drive 10. In one configuration, the meter 308 may be coupled to the disc drive 10 via a cable 320. In another aspect, the meter 308 is adapted to store and/or transmit signal level changes change measurements for analysis to measurement equipment such as a data logger, oscilloscope, or other equipment adapted to receive, analyze, and provide data output to an end user or system, for example, via an input/output cable 321.

In one configuration, the air-detection apparatus 304 is coupled to a data processing system 309 via input/output cable 321 to receive/transmit data with respect to the disc drive input/output signal value changes. In one aspect of the invention, the data processing system 309 may include a computer or other controller adapted to analyze and display input/output signals of the disc drive 10, and may display the data on an output device such as a computer monitor screen. In general, the data processing system 309 may include a controller, such as programmable logic controller (PLC), computer, or other microprocessor-based controller. The data processing system 309 may include a Central Processing Unit (CPU) in electrical communication with a memory, wherein the memory may contain an air-contamination detection program that, when executed by the CPU, provides support for controlling the testing apparatus 300. In another aspect of the invention, the data processing system 309 may provide control signals to the disc drive 10 as part of the process of detecting air-contamination within the hydrodynamic bearings 37. The air-contamination detection program may conform to any one of a number of different programming languages. For example, the program code can be written in PLC code (e.g., ladder logic), C, C++, BASIC, LABVIEW, Pascal, or a number of other languages and is well within the skill in the art to those or this field. The general approach is discussed below, for example in FIG. 4.

Figure 4:
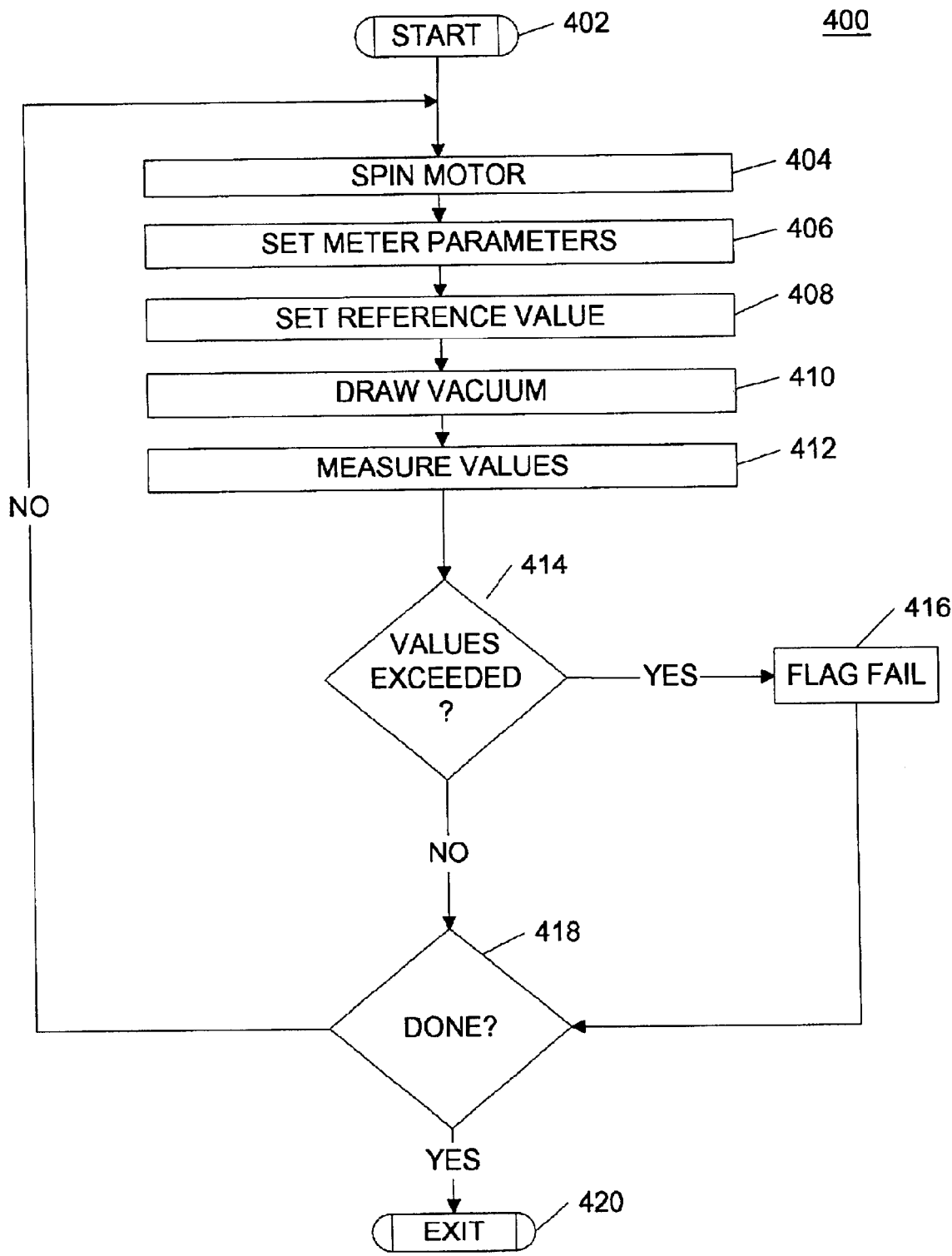
FIG. 4 depicts one embodiment of a method for determining air-contamination for use with aspects of the invention.

FIG. 4 depicts a flow diagram of a method 400 to detect air-contamination within hydrodynamic bearings 37. FIGS. 1, 2, 3A and 3B are referenced as needed with the discussion of FIG. 4. Specifically, the method 400 starts at step 402 when a measurement process is, for example, initiated by a user activating an air-detection apparatus 304 configured to detect air-contamination within a hydrodynamic bearing 37. At step 404 the meter 308 is activated to measure the activation signals to the disc drive 10 such as power, voltage, current, and combinations thereof. In one configuration the spindle motor 32 is activated during testing to rotate at one or more desired RPM between about 4200 and 10,000 or more, depending on the proposed operational standards.

At step 406, the meter 308 is configured to establish the threshold levels for detecting air-contamination using parameters such as input/output signal voltage, current, control signals, and other factors required to operate the disc drive 10. For example, a critical parameter value such as a pre-determined motor current usage may be set as a threshold value to flag the process controller of air-contamination within the hydrodynamic bearing 37. At step 408, the method 400 sets at least one reference parameter under at least one vacuum pressure level within the vacuum chamber 302, such as ambient air-pressure. It is contemplated, the reference parameter may be established any number of ways including, an RMS value of a plurality of detected input/output signal measurement values, a least squares regression model, and other methods of establishing a reference parameter. Once the reference distance determined and/or retrieved from a memory location such as the memory associated with the process controller 309, a vacuum of about between 1 to 750 Torr and is provided within the vacuum chamber 302 at step 410. In one aspect, the method 400 operates the back-end 301 and the vacuum pump 312 to establish a vacuum within the vacuum chamber 302.

At step 412, the method 400 measures the change in one or more input/output signal values of the disc drive 10 such as power consumption. As air-pressure within the hydrodynamic fluid 60 decreases, the volume of air due to contamination expands within the hydrodynamic fluid 60. The expansion of air generally decreases the average viscosity of the hydrodynamic fluid 60. As the viscosity of the hydrodynamic fluid 60 decreases, the power consumption of the disc drive motor may also change. The power consumption may also change if misalignment of the shaft or thrust plate results from the presence of air in the fluid, weakening the support provided. In one aspect, at step 414, the method 400 compares the amount of measured input/output variation to the reference value and/or to acceptable threshold values to determine an unacceptable disc drive operating condition related to air-contamination within the hydrodynamic bearing 37. If the changes in at least one input/output signal do not exceed the reference and/or threshold values, the method 400 proceeds to step 418 described below. If the changes in at least one input/output signal exceed the reference and/or threshold values, the method 400 proceeds to step 416 to issue a message, such as a failure message to the process controller 309, for example. At step 418, the method 400 determines if the detection process is complete. If the detection process is complete, the method 400 proceeds to step 420 and exits. However, if the detection process is not complete, the method returns to step 404.

Figure 5:
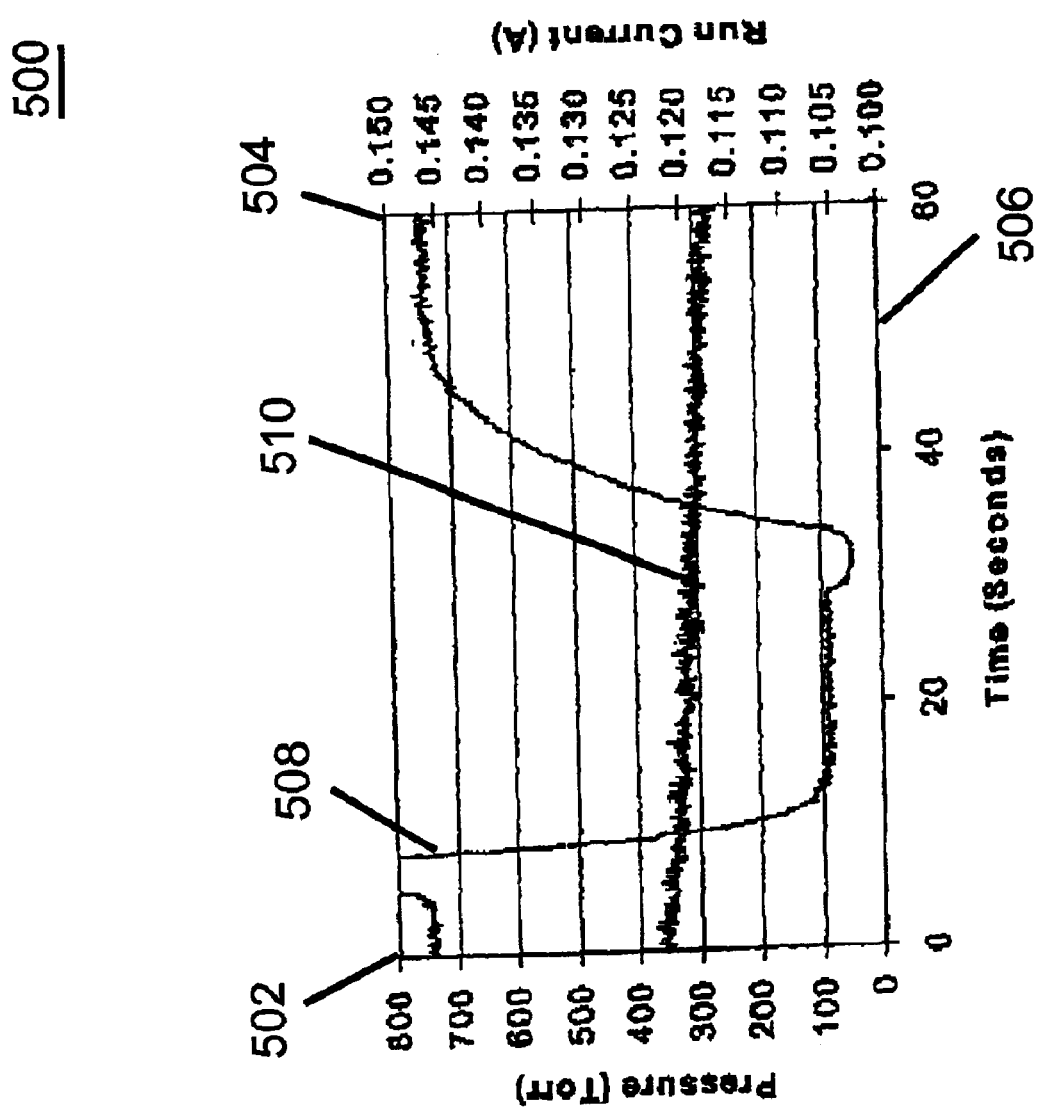
FIG. 5 illustrates an output waveform corresponding to a measurement of a disc drive run current when the pressure on the disc drive is varied and the bearing is good.

FIG. 5 is an output graph illustrating one current measurement of a disc drive 10 having an acceptable level of air-contamination while the pressure on the hydrodynamic bearing 37 is varied between a plurality of vacuum pressures or from ambient to a different pressure. FIGS. 1–4 are referenced as necessary in the discussion of FIG. 5. The y-axis of a graph 500 are indicative of a measured run current 504 versus a measured pressure change 502 made with respect to the x axis, representing time 506. As illustrated, as the pressure 508 is decreased from between about 750 Torr to about 100 Torr, the input current 510 of the disc drive 10 under test decreases from about 0.120 A to about 0.118 A over about a sixty second period of time. No step changes of current draw are indicated. The amount of air-contamination is insufficient to alter the viscosity of the hydrodynamic fluid 60 beyond a threshold value. The change in run current may be attributable to the temperature rise during the disc drive operation which can lower the average viscosity. Accordingly, it is contemplated that measurement sensitivity may be increased by making several measurements of one or more acceptable disc drive run currents and subtracting the viscosity change due to temperature.

Figure 6:
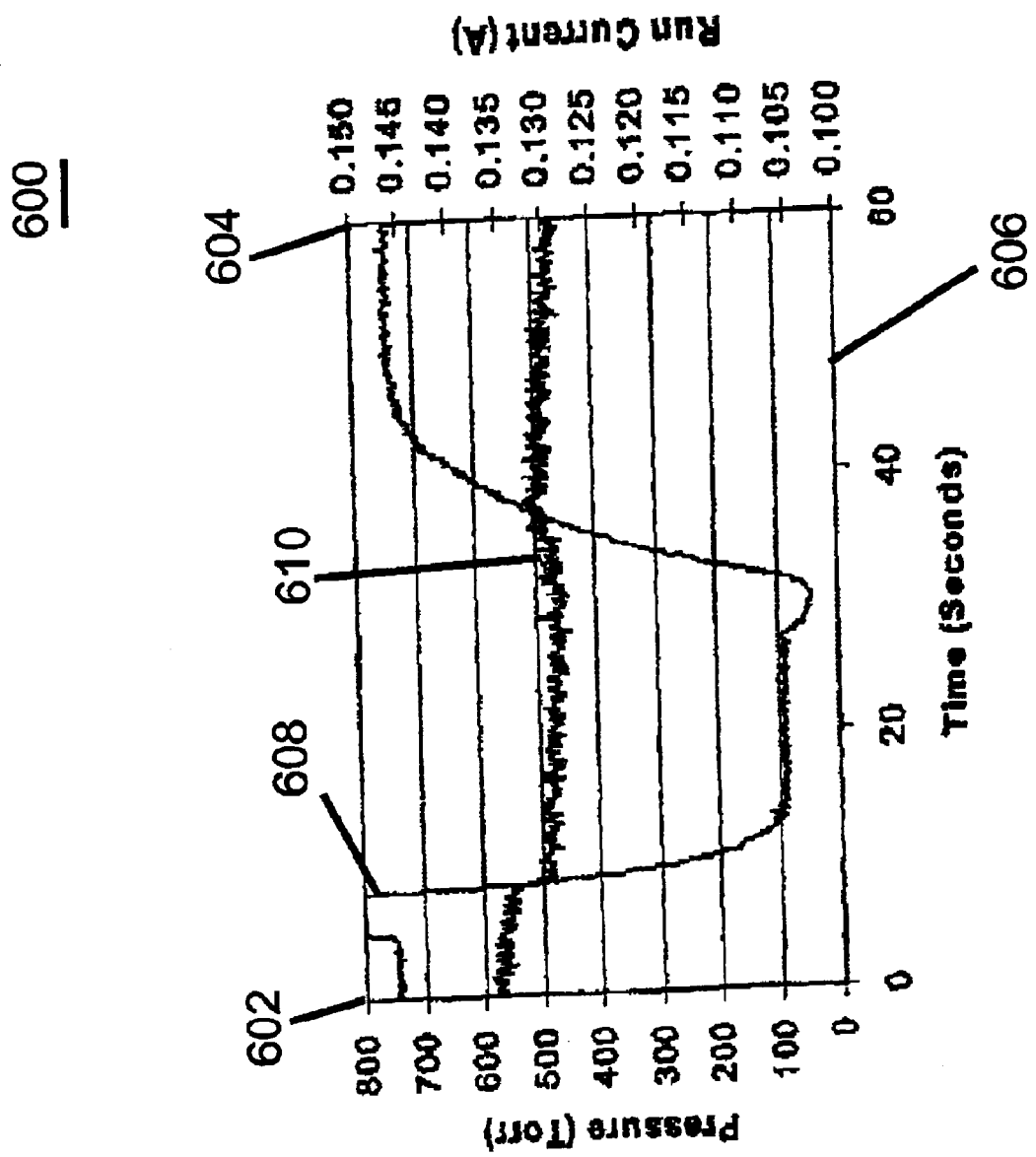
FIG. 6 illustrates an output waveform corresponding to a measurement of a disc drive run current when the pressure on the disc drive is varied and the bearing fails.

FIG. 6 is an output graph illustrating one current measurement of a disc drive 10 having un-acceptable air-contamination while the pressure on the hydrodynamic bearing 37 is varied over a plurality of vacuum pressures or from ambient to a different pressure. FIGS. 1–5 are referenced as necessary in the discussion of FIG. 6. The y-axis of a graph 600 are indicative of a measured run current 604 versus a measured pressure change 602 made with respect to the x axis, representing time 606. As illustrated, as the pressure 608 is decreased from between about 750 Torr to about 100 Torr, the input current 610 of the disc drive 10 under test decreases from about 0.133 A to about 0.129 A. A sudden decrease in the average viscosity of the hydrodynamic fluid 60 illustrated by a sudden pressure drop at a pressure of about 100 Torr, after about ten seconds, may be one parameter change indicative of an unacceptable amount of air-contamination within the hydrodynamic bearing 37. As the viscosity of the hydrodynamic fluid decreases with temperature increase, the step change of current is generally attributable to the sudden change in viscosity due to air-contamination. Accordingly, unacceptable air-contamination thresholds may be set to detect a sudden variation in run current of the disc drive 10.

While the foregoing is directed to embodiments of the invention, other and further embodiments of the invention may be devised without departing from the basic scope thereof. For example, the air pressure may be varied in either a positive or negative sense. One of the pressures may simply be ambient pressure. The scope of the invention is determined by the claims that follow and equivalents.

What is claimed is:

1. A method of measuring air-contamination within a hydrodynamic bearing of a disc drive, comprising;
    rotating a disc drive motor;
    taking a first measurement of a disc drive input/output signal responsive to air-contamination within the hydrodynamic bearing, the first measurement taken at a first pressure;
    comparing a second measurement of the disc drive input/output signal to the first measurement, the second measurement taken at a second pressure which is different from the first pressure; and
    determining if a difference between the first and second measurements is indicative of air contamination within the hydrodynamic bearing.

2. The method of claim 1, wherein the disc drive input/output signal comprises a first disc drive motor input signal.

3. The method of claim 2, wherein the first disc drive motor input signal comprises at least one of, voltage, current, and power.

4. The method of claim 2, further comprising prior to taking the first measurement, providing the first pressure in a vacuum chamber where the hydrodynamic bearing is located.

5. The method of claim 4, wherein the step of comparing a second measurement comprises establishing at the first pressure a threshold disc drive motor input signal value, wherein an unacceptable disc drive operational condition exists when the first disc drive motor input signal exceeds, at the second pressure, the threshold disc drive motor input signal value.

6. The method of claim 1, wherein the disc drive input/output signal comprises a disc drive motor current, and the first measurement of the disc drive motor current establishes a reference value indicating an acceptable amount of air-contamination within the hydrodynamic bearing.

7. The method of claim 6, further comprising providing a vacuum to the disc drive to generate the second pressure, wherein the second measurement of the disc drive input/output signal taken at the second pressure indicates a change in the disc drive motor current.

8. The method of claim 7, wherein the determining step comprises establishing a threshold value for the disc drive motor current, wherein an unacceptable disc drive operational condition exists when the second measurement of the disc drive input/output signal exceeds the threshold value.

9. An apparatus for measuring air-contamination within a disc drive hydrodynamic bearing, comprising:
    means for rotating a disc drive motor;
    means for exerting a first and a second external pressure on the disc drive hydrodynamic bearing; and
    means for detecting, during the rotation of the disc drive motor, disc drive input/output signals responsive as a function of air-contamination within the hydrodynamic bearing to the first and the second external pressures.

10. The apparatus of claim 9, wherein the means for detecting comprises a monitor means to monitor the disc drive input/output signal at the first external pressure.

11. The apparatus of claim 10, wherein the monitor means monitors a second disc drive input/output signal at the second external pressure, wherein an unacceptable amount of air contamination exists within the hydrodynamic bearing if the second disc drive input/output signal exceeds a threshold value.

12. The apparatus of claim 9, wherein the disc drive input/output signals are selected from the disc drive current, voltage, and power.

13. The apparatus of claim 9, wherein the means for detecting the disc drive input/output signals comprises a meter adapted to measure the disc drive input/output signals.

14. The apparatus of claim 13, wherein the meter is selected from a group consisting of current meter, oscilloscope, power meter, volt meter, network analyzer, spectrum analyzer.

* * * * *